United States Patent [19] | [11] 4,287,789
Dudleston et al. | [45] Sep. 8, 1981

[54] ENGINE THROTTLE CONTROL FOR MARINE PROPULSION DEVICES AND THE LIKE

[75] Inventors: Alan R. Dudleston, Waukegan, Ill.; Harry Stemper, Milwaukee, Wis.

[73] Assignee: Outboard Marine Corporation, Waukegan, Ill.

[21] Appl. No.: 176,274

[22] Filed: Aug. 8, 1980

Related U.S. Application Data

[62] Division of Ser. No. 939,778, Sep. 5, 1978, Pat. No. 4,237,747.

[51] Int. Cl.[3] .................... G05G 7/02; F16K 31/524; F16K 31/528

[52] U.S. Cl. .................................... 74/516; 74/104; 74/107; 251/263; 261/38

[58] Field of Search ................ 74/104, 107, 482, 513, 74/516; 251/263; 261/38

[56] References Cited

U.S. PATENT DOCUMENTS

| | | | |
|---|---|---|---|
| 667,350 | 2/1901 | Ulrich et al. | 74/104 X |
| 2,361,103 | 10/1944 | Issigonis | 251/263 X |
| 2,648,351 | 8/1953 | Curtis et al. | 74/516 X |
| 3,525,415 | 8/1970 | Bata et al. | 74/513 X |

FOREIGN PATENT DOCUMENTS

| | | | |
|---|---|---|---|
| 16035 | 4/1953 | Fed. Rep. of Germany | 74/516 |
| 704801 | 3/1954 | United Kingdom | 74/516 |

*Primary Examiner*—Allan D. Herrmann
*Attorney, Agent, or Firm*—Michael, Best & Friedrich

[57] ABSTRACT

Disclosed herein is an engine throttle control for marine propulsion devices and the like, which control includes a main control lever mounted for movement between a neutral or idle position and a full throttle position, a throttle lever adapted to actuate the engine throttle in response to rotational movement of the throttle lever, an actuation member operably connected to the control lever and mounted for movement in response to movement of the control lever, and means connecting the throttle lever to the actuation member for rotating the throttle lever in response to the movement of the actuation member and for effecting gradually increasing rotational movement of the throttle lever relative to incremental movement of the actuation member during at least a portion of control lever movement from the idle position toward the full throttle position.

1 Claim, 8 Drawing Figures

ENGINE THROTTLE CONTROL FOR MARINE PROPULSION DEVICES AND THE LIKE

This is a division of application Ser. No. 939,778 filed Sept. 5, 1978 now U.S. Pat. No. 4,237,747.

BACKGROUND OF THE INVENTION

The invention relates to mechanisms for controlling the movement of a throttle in an internal combustion engine and, more particularly, to engine throttle controls for marine propulsion devices, such as outboard motors and stern drive units.

Marine propulsion devices commonly employ a single lever control including a main control lever which is movable in opposite directions from a neutral position to sequentially actuate the clutch and then advance the throttle setting. With this arrangement, the clutch is actuated to either a forward drive or reverse drive position before there is an appreciable advancement of the throttle and the clutch can not be actuated before the throttle is returned to a low speed or idle setting. The main control lever is usually connected to the throttle valve of the engine carburetor via a linkage arrangement, such as a push-pull cable, which is connected to a rotatable or pivotable throttle lever adapted to actuate the throttle valve.

When the push-pull cable is connected directly to the throttle lever, incremental movement of the main control lever from the neutral or idle position can produce a variable amount of throttle lever movement and, thus, unequal throttle setting advancement for the same amount of main control lever movement. Consequently, during portions of the main control lever movement between the idle and full throttle positions, relatively small amounts of control lever movement can produce relatively large advancement of the throttle setting. This condition is particularly undesirable at lower engine speeds when uniform throttle control is usually most needed for boat handling, for example, when easing a boat up to a dock or the like.

SUMMARY OF THE INVENTION

The invention provides an engine throttle control including a control lever mounted for movement between a neutral or idle position and a full throttle position, a throttle lever adapted to actuate the engine throttle in response to rotational movement of the throttle lever, an actuation member operably connected to the control lever and mounted for movement in response to movement of the control lever, and means connecting the throttle lever to the actuation member for rotating the throttle lever in response to movement of the actuation member and for effecting gradually increasing rotational movement of the throttle lever relative to incremental movement of the actuation member during at least a portion of control lever movement from the idle position toward the full throttle position.

The invention also provides such a throttle control including means for rapidly increasing movement of the throttle lever relative to incremental movement of the actuation member after the control lever has been moved to a position intermediate the idle and full throttle positions.

Still further, the invention also provides such a throttle control including means on the actuation member for forcibly returning the engine throttle to the idle position during return movement of the control lever from the full throttle position toward the idle position.

In one embodiment, the actuation member comprises a pivot arm mounted for pivotal movement in response to movement of the control lever and the connecting means includes a link pivotally connected to the throttle valve and to the pivot arm in a manner whereby the distance between the pivot axis of the pivot arm and the pivotal connection of the link with the pivot arm increases during movement of the pivot arm from the idle position toward the full throttle position.

In one embodiment, the end of the link connected to the pivot arm has a first part which is pivotally carried by the pivot arm at a first radius from the pivot arm axis and is engaged by the pivot arm for effecting movement of the throttle arm in response to movement of the pivot arm from the idle position to a position intermediate the idle and full throttle positions and a second part which is engaged by the pivot arm, after the pivot arm has reached the intermediate position, at a second radius from the pivot arm axis greater than the first radius for effecting movement of the throttle lever in response to movement of the pivot arm from the intermediate position toward the full throttle position.

In one embodiment, the actuation member comprises a cam plate mounted for pivotal movement in response to movement of the control lever and having a cam slot extending at an increasing radius from the pivot axis of the cam plate in a direction opposite to the direction of cam plate movement from the idle position toward the full throttle position. The cam plate is connected to the throttle lever by a follower mounted on the throttle lever in spaced relationship to the rotational axis of the throttle lever and received in the cam slot for translational and rotary movement relative to the cam plate.

In one embodiment, the actuation member comprises a cam plate mounted for translational movement relative to the rotational axis of the throttle lever in response to movement of the control lever and having an inclined cam surface extending at an increasing distance from the throttle lever axis with respect to the direction of cam plate movement from the idle position toward the full throttle position. The cam plate is connected to the throttle lever by a follower mounted on the throttle lever in spaced relationship to the throttle lever axis and engaged by the cam surface for translational and rotary movement relative to the cam plate.

One of the principal features of the invention is the provision of an engine throttle control which includes a control lever operably connected to a rotatable engine throttle and is capable of providing a controlled, coordinated movement of the throttle during movement of the control lever between idle and full throttle positions to achieve smooth, substantially uniform acceleration and deceleration of the engine.

Another of the principal features of the invention is the provision of an engine throttle control including a control lever operably connected to a rotatable engine throttle in a manner whereby movement of the control lever from an idle position toward a full throttle position provides gradually increasing rotational movement of the throttle relative to incremental movement of the control lever.

A further of the principal features of the invention is the provision of an engine throttle control including a control lever operably connected to a rotatable engine throttle through an actuation member incorporating means for forcibly closing the throttle when the control lever is moved from a full throttle position toward the idle position.

A still further of the principal features of the invention is the provision of an engine throttle control including a control lever, an actuation member mounted for movement in response to movement of the control, and means connecting the actuation member to a rotatable engine throttle in a manner whereby the movement of the throttle relative to incremental movement of the control lever is rapidly increased after the control lever has been moved to a position intermediate an idle position and a full throttle position.

Other features, aspects, and advantages of the invention will become apparent to those skilled in the art upon reviewing and following detailed description, the drawings, and the appended claims.

Figure 1:
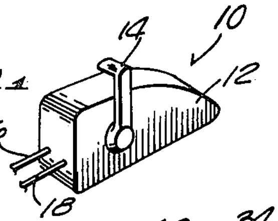
FIG. 1 is a reduced perspective view of a single lever control for a marine propulsion device.

Before explaining at least one embodiment of the invention in detail, it is to be understood that the invention is not limited in its application to the details of construction and the arrangements of the components set forth in the following description or illustrated in the drawing. The invention is capable of other embodiments and of being practiced or carried out in various ways. Also, it is to be understood that the phraseology and terminology employed herein is for the purposes of description and should not be regarded as limiting.

DESCRIPTION OF THE PREFERRED EMBODIMENT

Illustrated in FIG. 1 is a conventional single lever control 10 for operating the clutch and throttle of a remotely located marine propulsion device, such as an outboard motor or a stern drive unit. The single lever control 10 includes a housing or frame 12 and a main control lever 14 mounted for pivotal or rotational movement relative to and exteriorly of the housing 12.

The engine clutch is actuated in response to rotational movement of the main control lever 14 in opposite directions from the illustrated neutral or engine idle position via a push-pull link of cable 16 operably connected at the opposite ends to the main control lever 14 and to the clutch in a conventional manner. Throttle control is effected in response to rotational movement of the main control lever 14 in opposite directions from the neutral or engine idle position, after clutch actuation, via a push-pull cable 18 which at one end is operably connected to the main control lever 14 in a conventional manner and at the opposite end is operably connected to a throttle control mechanism to be described.

The components of the single lever control 10 operably connecting the main control lever 14 to the clutch actuation cable 16 and to the throttle control cable 18 for providing the desired movement of these cables are of conventional design and do not form part of the invention. Therefore, a detailed description and illustration of same are not necessary for full understanding of the invention.

Figure 2:
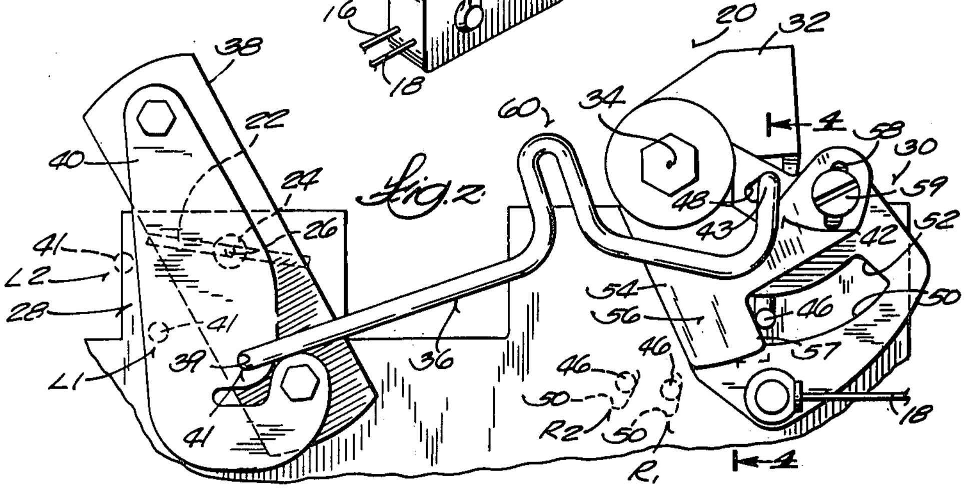
FIG. 2 is a side elevational view of a throttle control embodying various of the features of the invention and operably connectable to the single lever control shown in FIG. 1. Various components of the throttle control are illustrated in their locations when the main control lever is in the neutral or idle position.
Figure 3:
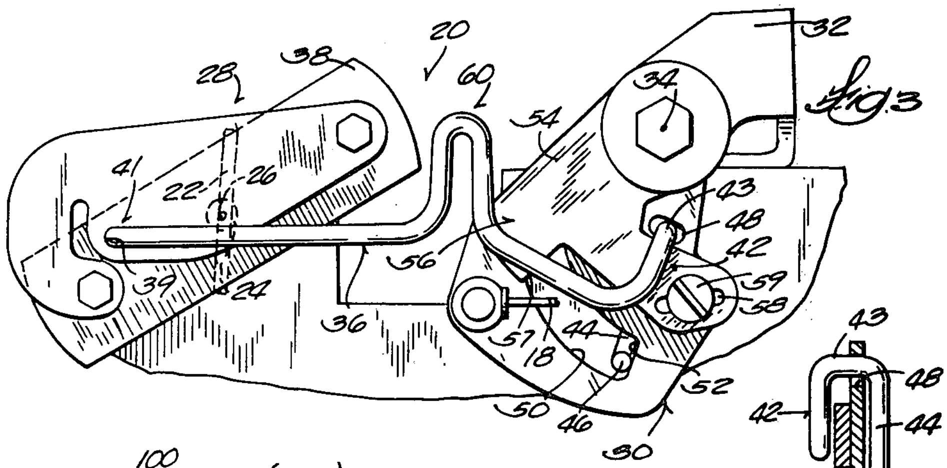
FIG. 3 is a view similar to FIG. 2 illustrating the location of various components when the main control lever is in the full throttle position.
Figure 4:
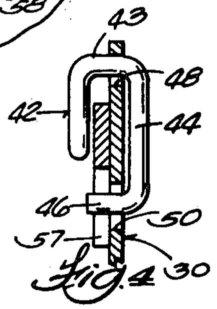
FIG. 4 is a sectional view taken generally along line 4—4 in FIG. 2.

Illustrated in FIGS. 2–4 is a throttle control 20 for controlling the rotational movement of a conventional butterflytype throttle plate or valve 22 carried inside an engine carburetor (not shown) on a shaft 24 mounted for rotation about a horizontal axis designated by reference numeral 26. The throttle control 20 includes a throttle arm or lever 28 mounted for common rotation with the throttle shaft 24, a pivot lever or arm 30 connected to the main control lever 14 via the throttle control cable 18 and mounted on a stationary support bracket 32 for pivotal movement about a horizontal axis designated by reference numeral 34, and a link 36 connecting the throttle lever 28 with the pivot arm 30.

In the specific construction illustrated, the throttle lever 28 is comprised of two parts, an inner arm or lever 38 of an existing carburetor construction and an outer arm or lever 40 affixed on the inner arm 38 and adapted for connection to the link 36 to provide controlled rotational movement of the throttle valve 22 in response to movement of the main control lever 14 as described below.

Means are provided for operably connecting the respective opposite ends 41 and 42 of the link 36 to the throttle lever 28 and to the pivot arm 30 for effecting gradually increasing movement of the throttle lever 28, and thus the throttle valve 22, relative to the amount of main control lever movement during at least a portion of the main control lever movement from the idle position to the full throttle position. That is, the amount of main control lever movement required to move the throttle lever 28 a given increment gradually decreases and smooth, substantially uniform engine acceleration is achieved. In this specific construction illustrated in FIGS. 2–4, such connecting means comprises providing the outer arm 40 of the throttle lever 28 with an aperture 39 for pivotally receiving the left end 41 of the link 36 and forming the right end 42 of the link 36 (FIG. 4) in an inverted G-shape including a first or upper cross leg 43, a vertical leg 44, and a second or lower cross leg 46. The connecting means further comprises providing the pivot arm 30 with a first or upper oblong slot 48 which receives the upper cross leg 43 and a second or lower arcuate slot 50 which is considerably larger than the upper slot 48 and receives the lower cross leg 46.

During initial pivotal movement of the pivot arm 30 (in the clockwise direction as viewed in FIGS. 2 and 3) from the idle position illustrated in FIG. 2 toward the full throttle position illustrated in FIG. 3 in response to movement of the main control lever 14, the upper cross leg 43 is engaged by the right end wall of the upper slot 48 and the right end 42 of the link 36 is moved through an arc having a radius generally corresponding to the distance between the pivot arm axis 34 and the center of the upper cross leg 43. The upper slot 48 preferably is located relative to the pivot arm axis 34 so that the lever arm acting on the right end 42 of the link 36 is almost horizontal when the pivot arm 30 is in the idle position. The upper slot 48 is angularly offset from the horizontal, e.g. 5°–10°, to provide a small lever arm on the right end 42 of the link 36 during initial rotational movement of the pivot arm 30. Also, the aperture 39 in the outer throttle arm 40 pivotably receiving the left end 41 of the link 36 preferably is located relative to the throttle shaft axis 26 so that the lever arm acting on the left end 41 of the link 36 is substantially vertical when the pivot arm 30 is in the idle position.

With this arrangement, initial movement of the pivot arm 30 in a clockwise direction causes the right end 42 of the link 36 to be moved primarily in a downward vertical direction and there is very little translational movement of the link 36 toward the left. In other words, there is very little movement of the throttle lever 28, and thus the throttle valve 22, even though there is a relatively large amount of rotational movement of the main control lever 14. As the upper slot 48 is moved beneath the pivot arm axis 34, the right end 42 of the link 36 is moved primarily to the left resulting in greater translational movement of the link 36 with the same amount of rotational movement of the main control lever 14. At the same time, the left end 41 of the link 36 is moved primarily in an upward vertical direction resulting in a substantially uniform, gradually increasing rotational movement of the throttle valve 22 relative to the amount of rotational movement of the main control lever 14.

After the pivot arm 30 has been moved in the clockwise direction through a predetermined arc (corresponding generally to the arc of the lower slot 50) to an intermediate engine speed position, the right end wall 52 of the slot 50 engages the lower cross leg 46. During continued movement of the pivot arm 30 in the clockwise direction, the right end of the upper slot 48 is disengaged from the upper cross leg 43 and the right end 42 of the link 36 thereafter is moved through an arc generally corresponding to the distance between the pivot arm axis 34 and the center of the lower cross leg 46. Translational movement of the link 36 to the left is increased because of the larger radius of rotation of the right end 42. At the same time, the left end 41 of the link 36 is being moved through the portion of its arc where a relatively small translational movement imparts a large rotational movement on the throttle lever 28. As a consequence, rotational movement of the throttle valve 22 relative to the amount of pivot arm movement increases substantially and the throttle is advanced from an intermediate speed setting to a full throttle setting over a relatively short range of the main control lever movement.

In the specific construction illustrated, the throttle valve 22 travels through approximately 85° in moving from the idle position illustrated in FIG. 2 to the full throttle position illustrated in FIG. 3 and the lower pivot arm slot 50 is arranged so that the right end wall 52 thereof engages the lower cross leg 46 when the throttle valve 22 is approximately 50° from the idle position. At that point, the lower cross leg 46 and the right end wall 52 of the lower slot 50 are located substantially directly beneath the pivot arm axis 34 as indicated by the dashed line position designated by $R_1$ in the right hand portion of FIG. 2 and the left end 41 of the link 36 is located in the dashed line position designated by $L_1$ in the left hand portion of FIG. 2. The locations of the lower cross leg 46 and the left end 41 of the link 36 when throttle valve 22 is in the full throttle position are illustrated in FIG. 2 by the dashed line positions designated by $R_2$ and $L_2$, respectively.

From this illustration it can be seen that the amount of pivot arm movement to effect the first 50° of throttle valve opening is substantially larger than the amount required to effect the last 35° of throttle valve opening. Thus, throttle advancement is less sensitive to main control lever movement at low and intermediate engine speeds where close control is more desirable.

The throttle valve 22 is urged toward the idle position in the usual manner by a biasing means, such as a torsion spring (not shown) acting on the throttle shaft 24. As the pivot arm 30 is rotated in the counterclockwise direction in response to return movement of the main control lever 14 toward the idle position, the link 36, in cooperation with the throttle lever 28 and the pivot arm 30, controls movement of the throttle valve 22 relative to main control lever movement in a manner opposite to that during throttle advancement. That is, the throttle valve 22 moves to the intermediate speed position with small main control lever movement and main control lever movement relative to throttle valve movement thereafter gradually increases and smooth, substantially uniform engine deceleration is achieved.

Means preferably are provided on the pivot arm 30 for forcibly moving the throttle valve 22 to the idle position in the event the biasing means does not return the throttle valve to the idle position because of a failure of the biasing means, sticking of the throttling valve 22, etc. In the specific construction illustrated, such means comprises a plate 54 mounted on the pivot arm 30 and having a portion 56 covering the left end portion of the lower slot 50. As the pivot arm 30 is rotated in the counterclockwise direction, an edge 57 on the portion 56 engages the lower cross leg 46, causing the link 36 to pull the throttle valve 22 to the idle position via the throttle lever 28. The plate 54 preferably is provided with a slot 58 for receiving a mounting bolt 59 threaded into the pivot arm 30 so the location of the edge 57 can be adjusted relative to the slot 50 to insure that the edge 57 will engage the lower cross leg 46 and pull the throttle valve 22 all the way to the idle position during movement of the pivot arm 30 to the idle position.

Means preferably are provided for adjusting the length of the link 36. While various arrangement can be used, in the specific construction illustrated, such means comprises providing the link 36 with an intermediate, bendable U-shaped portion 60 which can be bent further or partially unbent to adjust the length of the link 36 as required.

Figure 5:
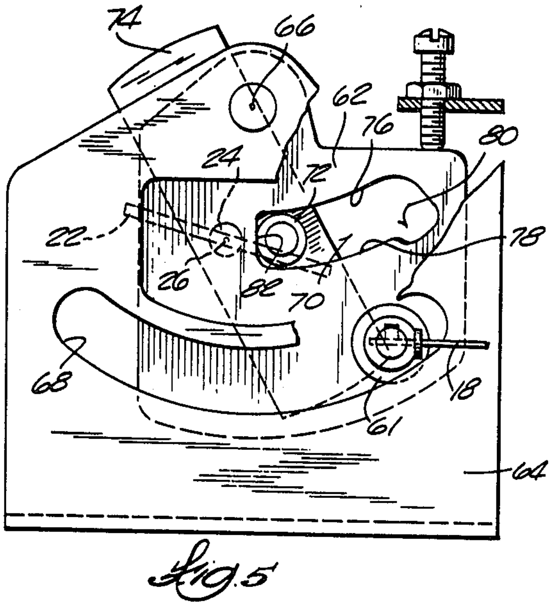
FIG. 5 is a partially broken away, side elevational view of an alternate construction for the throttle control illustrating the location of various components when the main control is in the neutral or idle position.
Figure 6:
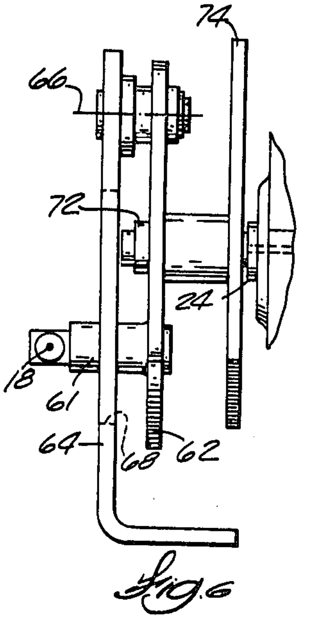
FIG. 6 is a right end elevational view of the control shown in FIG. 5 and FIG. 7.
Figure 7:
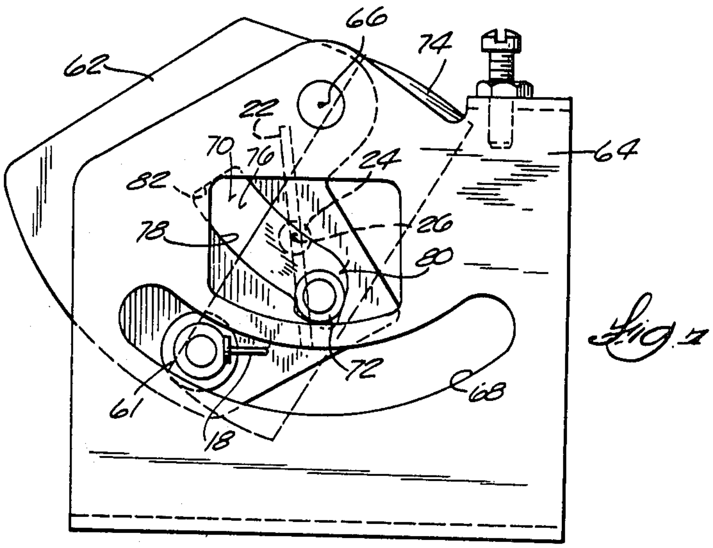
FIG. 7 is a view similar to FIG. 5 illustrating the location of various components when the main control lever is in the full throttle position.

In the alternate construction illustrated in FIGS. 5–7, the throttle control cable 18 of the single lever control 10 is connected to a lug 61 on a cam plate 62 mounted on a stationary support bracket 64 for pivotal movement about a horizontal axis designated by reference numeral 66. The lug 61 extends through an arcuate slot 68 in the support bracket 64 to permit free pivotal movement of the cam plate 62 relative to the support bracket 64 in response to movement of the main control lever 14 via the throttle control cable 18.

The cam plate 62 has an arcuate cam slot 70 which receives a roller or follower 72 rotatably mounted on a throttle arm or lever 74 which is mounted for common rotation with the throttle shaft 24. In FIG. 5, the cam plate 62 and the throttle lever 74 are illustrated in their locations when the throttle valve 22 is in the idle position and the throttle valve 22 is moved toward the full throttle position by rotating the throttle lever 74 in the clockwise direction. The cam slot 70 has opposed, generally parallel upper and lower edges 76 and 78 which extend at an increasing radius from the cam plate axis 66 in the counterclockwise direction, i.e., in a direction opposite to the direction of throttle plate movement from the idle position toward the full throttle position.

The throttle lever follower 72 is spaced from the throttle lever axis 26 such that, as the cam plate 62 is rotated in a clockwise direction relative to the throttle lever 74 in response to movement of the main control lever 14 from the idle position toward the full throttle position, the upper edge 76 of the cam slot 70 rides down against the follower 72 and causes clockwise rotation of the throttle lever 74, and thus the throttle valve 22. Initial movement of the main control lever 14 effects very little rotational movement of the throttle lever 74 because of the small radius of rotation of the cam plate 62 i.e., the distance between the cam plate axis 66 and the upper edge 76 of the cam slot 70. Because of the configuration of the cam slot 70, this radius of rotation increases during further rotational movement of the cam plate 62, causing a gradual increase in the rotational movement of the throttle valve 22 relative to the amount of main control lever movement.

The right end of the cam slot 70 is provided with an offset portion 80 which captures or traps the follower 72 after the throttle valve 22 has been moved to an intermediate engine speed position, e.g. 50° open. During continued movement of cam plate 62, the cam plate 62 and the throttle lever 74 rotate together, thereby effecting an increased amount of throttle valve movement relative to the amount of main control lever movement.

During return movement of the main control lever 14 from the full throttle position to the intermediate speed position, the cam plate 62 and the throttle lever 74 rotate together until the cam plate 62 is returned to the intermediate speed position. The lower edge 78 of the cam seat 70 thereafter rides up against the follower 72 to provide relative movement of the throttle valve 22 and the main control lever 14 opposite to that described above. The lower edge 78 of the cam slot 70 serves to forcibly return the throttle valve 22 to the idle position in the same general manner as the plate 54 in the construction illustrated in FIGS. 2–4.

Figure 8:
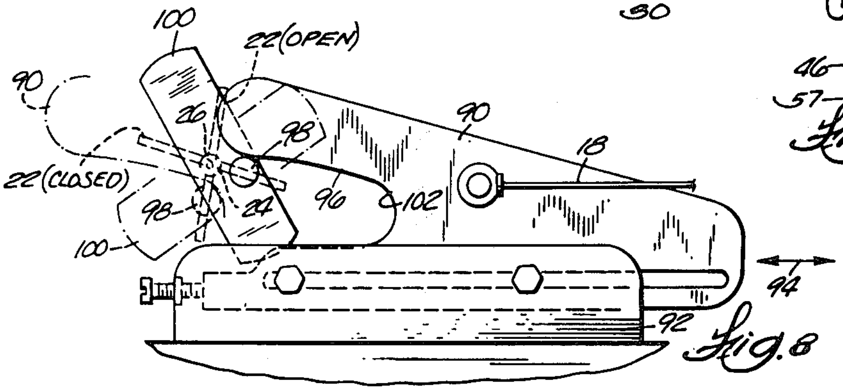
FIG. 8 is a side elevational view of another alternate construction for the throttle control.

The alternate construction illustrated in FIG. 8 employs a translational cam for effecting the desired movement of the throttle valve 22 relative to the movement of the main control lever 14. More specifically, the throttle control cable 18 of the single lever control 10 is connected to a cam plate 90 mounted on a stationary support bracket 92 for translational movement relative to the support bracket 92 and to the throttle shaft axis 26 as indicated by the arrow 94. The cam plate 90 has an inclined cam surface 96 which engages a roller or follower 98 rotatably mounted on a throttle lever 100 mounted for common rotation with the throttle shaft 24. The locations of the cam member 90 and the throttle lever 100 when the main control lever 14 is in the idle position and in the full throttle position are illustrated by solid and dashed lines, respectively. The throttle valve 22 is moved from the indicated closed or idle position to the indicated open or full throttle position by rotating the throttle lever 100 in the clockwise direction.

The cam surface 96 extends at an increasing distance from the throttle shaft axis 26 with respect to the direction of cam member movement from the idle position toward the full throttle position. The throttle lever follower 98 is offset from the throttle shaft axis 26 such that, as a cam plate 90 is moved to the left in response to movement of the main control lever 14 from the idle position toward the full throttle position, the cam surface 96 rides down against the follower 98 and causes clockwise rotation of the throttle lever 100, and thus the throttle valve 22. The configuration of the cam surface 96 provides the desired gradually increasing rotational movement of the throttle valve 22 relative to the amount of main control lever movement.

After throttle valve 22 has been moved to an intermediate engine speed position, e.g. 50° open, the right or terminal end portion 102 of the cam surface 96 engages the follower 98. During continued movement of the cam plate 90, the full translational movement thereof is imparted to the throttle lever 100, thereby substantially increasing the amount of throttle valve movement relative to the amount of main control lever movement. When the cam plate 90 is moved to the right in response to movement of the main control lever 14 from the full throttle position toward the idle position, the throttle valve 22 is returned to the idle position by a biasing means in the usual manner and the cam surface 96 controls the relative movement of the throttle valve 22 and the main control lever 14.

Various of the features of the invention are set forth in the following claims.

We claim:

1. A throttle control comprising a control lever mounted for movement between an idle position and a full throttle position, a throttle lever adapted to actuate an engine throttle in response to rotational movement of said throttle lever, a cam plate connected to said control lever and mounted for translatory movement between an idle position and a full throttle position and relative to the rotational axis of said throttle lever in response to movement of said control lever between the control lever idle and full throttle positions, said cam plate having an inclined cam surface including a terminal portion, and means connecting said cam plate to said throttle lever for rotating said throttle lever in response to movement of said cam plate and for effecting gradually increasing rotational movement of said throttle lever relative to incremental movement of said cam plate during at least a portion of control lever movement from the control lever idle position toward the control lever full throttle position, said connecting means including a follower mounted on said throttle lever in spaced relationship to the throttle lever axis and engageable by said cam surface, said follower being engaged by said cam surface terminal portion after movement of said cam plate to a position intermediate the cam plate idle and full throttle positions and so as to effect throttle controlling movement of said follower during movement of said cam plate from the cam plate intermediate position to the cam plate full throttle position.

* * * * *